United States Patent [19]

Pelov et al.

[11] 4,343,326

[45] Aug. 10, 1982

[54] APPARATUS FOR DISPENSING A LIQUID ADDITIVE

[75] Inventors: Iran P. Pelov, Montville; Brian R. Penman, Rockaway, both of N.J.

[73] Assignee: Exxon Research & Engineering Co., Florham Park, N.J.

[21] Appl. No.: 154,610

[22] Filed: May 30, 1980

[51] Int. Cl.$^3$ .............................................. B67D 3/00
[52] U.S. Cl. .................................... 137/454; 114/74 R; 114/125; 137/559; 141/302; 210/169; 210/925; 222/159
[58] Field of Search ...................... 137/453, 454, 559; 141/44, 293, 302; 114/74 R, 74 T, 74 A, 125, 333; 210/169, 925; 222/156, 159, 482

[56] References Cited

U.S. PATENT DOCUMENTS

| | | | |
|---|---|---|---|
| 1,240,532 | 9/1917 | Barrow et al. | 137/453 |
| 1,350,643 | 8/1920 | Costa | 137/453 |
| 1,972,962 | 9/1934 | Weber | 137/454 |
| 2,463,922 | 3/1949 | Turner | 141/293 |
| 2,689,628 | 9/1954 | Schott | 137/453 |
| 2,850,211 | 9/1958 | Fernandez | 222/159 |
| 3,093,267 | 6/1963 | Lowery | 137/454 |
| 3,810,835 | 5/1974 | Ferm | 210/925 |
| 3,929,157 | 12/1975 | Serur | 137/453 |
| 3,957,644 | 5/1976 | Edmonson | 210/169 |

FOREIGN PATENT DOCUMENTS 327472 7/1935 Italy ..................... 141/293

*Primary Examiner*—George L. Walton
*Attorney, Agent, or Firm*—Robert S. Salzman; Donald F. Wohlers

[57] ABSTRACT

An apparatus is provided for dispensing a liquid additive to the surface of a receding liquid in a pressurized vessel, particularly for automatically dispensing a liquid oil spreading agent to the surface of ballast water contained in a pressurized tank of a cargo carrier having oil based material at least partially floating on the surface thereof. The apparatus comprises a base fitting means mounted on said tank above said ballast water; a pressure equalization line having a top portion, an intermediate portion and a lower portion, said lower portion extending through said base fitting means to a point above the surface of said ballast water; a first valve located in said intermediate portion of said pressure equalization line; a liquid flow line having a top portion, an intermediate portion and a lower portion, said lower portion extending through said base fitting means to a point above the surface of said ballast water; said intermediate portion having an adjustable orifice; a second valve located in said intermediate portion of said liquid flow line; a container fitting disposed above said base fitting means having an internally threaded inner portion, the top portions of said pressure equalization line and said liquid flow line extending through said container fitting; and a container having an externally threaded neck for holding a predetermined quantity of said oil spreading agent threadably engaged to said container fitting, the top portion of said pressure equalization line extending above the end of said oil spreading agent.

3 Claims, 1 Drawing Figure

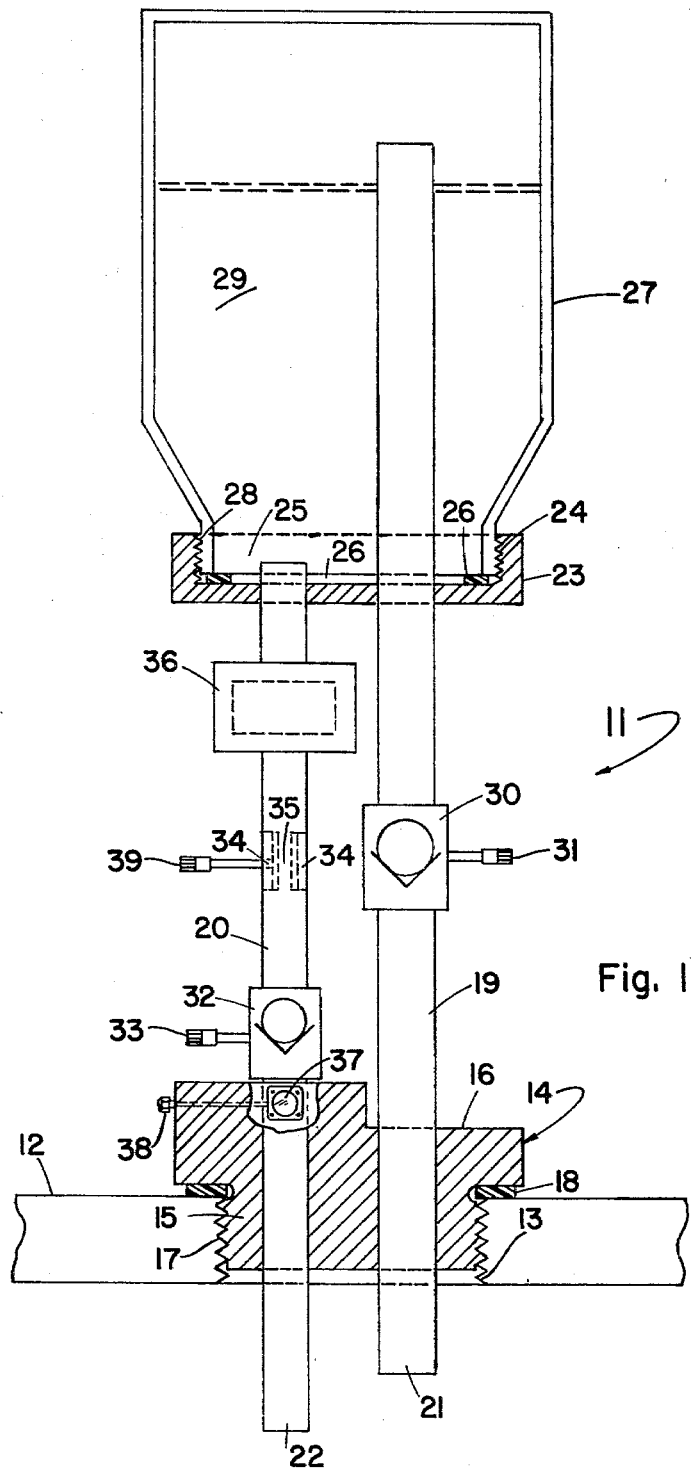

APPARATUS FOR DISPENSING A LIQUID ADDITIVE

BACKGROUND OF THE INVENTION

This invention is concerned with an apparatus for dispensing a liquid additive to the surface of a receding liquid in a pressurized vessel, and more particularly for automatically dispensing a liquid oil spreading agent to the surface of ballast water having oil-based material at least partially floating on the surface thereof contained in a pressurized tank of a cargo carrier.

In the past, a number of devices have been described for dispensing liquid to a container or other apparatus.

In U.S. Pat. No. 176,600 to E. H. Covell for example, a hydrocarbon fluid can be arranged to empty its contents into a carburetor without escape of vapor during filling is described containing a valved inlet line from the fluid to the inlet of a carburetor and a valved vapor line connected from the outlet of the carburetor to a point above the surface of hydrocarbon fluid in the can. When both valves are opened, fluid hydrocarbon flows out of the can through the inlet to the carburetor and the vapor generated passes up the vapor line back into the can by the vacuum created by withdrawal of fluid hydrocarbon from the can.

In U.S. Pat. No. 1,215,152 to W. Hoffa, an apparatus is described for supplying water to a receptacle as the water is consumed or the level of water is lowered in the receptacle. The apparatus consists of a reservoir and an inverted bell fitted inside the reservoir to form a cavity between the bell and reservoir. A valved inlet conduit extends from the cavity to a point above the water in the receptacle. An outlet conduit extends from below the surface of the water in the receptacle to a point above the minimum liquid level in the bell. When the level of water in the receptacle is lowered so that atmospheric air is permitted to enter the outlet conduit and pass upward into the bell, the bell is raised to permit a small quantity of water to enter the cavity and thence to the receptacle.

In U.S. Pat. No. 1,471,048 to A. Menger, an automatic battery water-supplying device is described comprising a container filled with distilled water positioned at a level higher than the battery. A supply pipe is connected with a three-way valve on the container to the battery. A fill tube is also connected with the three-way valve for filling the container externally. A vent tube from the battery at the same height as the supply pipe communicates with the interior of the container above the level of water therein.

The present invention, on the other hand, provides a liquid dispensing apparatus adapted to be mounted on a pressurized vessel containing a receding liquid to dispense a predetermined quantity of a liquid additive to the receding surface at a controlled rate of flow.

SUMMARY OF THE INVENTION

The present apparatus is particularly useful for automatically dispensing a predetermined amount of an oil-spreading agent to the surface of ballast water contained in a cargo carrier tank having oil-based materials such as oil and sludge deposits at least partially floating on the ballast surface. After addition of the oil-spreading agent the floating oil-based material is compressed against the vertical steel surfaces of the tank. As the ballast water is discharged, the oil and the oil-based material plates out on the steel surfaces vacated by the receding water. This retention of oil-based deposits in the tank allows a substantially pollution-free discharge of ballast to the sea without the familiar "oil sheen" on the sea water surface. Such a method, called chemical skimming, is described in commonly-owned U.S. patent application Ser. No. 128,726 filed Mar. 10, 1980. The apparatus comprises a base fitting means mounted on a pressurized tank containing the surface contaminated ballast water. A pressure equalization line extends downwardly through an opening in the fitting to a point above the surface of the water. A valve is located in the intermediate portion of the line above the base fitting. A liquid flow line also extends downwardly through an opening in the base fitting adjacent the pressure equalization line to a point above the liquid surface. The intermediate portion of this liquid flow line contains an adjustable orifice or constriction and a valve to control flow. The upper portion of the liquid flow and pressure equalization lines extend upwardly through a container fitting having secured thereon an inverted container containing a predetermined quantity of an oil spreading agent to be added to the ballast water. Such oil spreading agents include those materials heretofore used in coralling or herding oil spills at sea. A preferred oil spreading agent is a liquid material sold under the trademark Corexit OC-5$^R$. The upper end of the pressure equalization line extends above the surface of the liquid additive. In use, the valves of the pressure equalization line and liquid flow lines are opened and the required flow rate from the container to the tank is controlled by the head of liquid additive in the container and the size of the orifice. As the liquid level in the containers decreases, the flow rate also decreases. This makes the apparatus particularly suitable for chemical skimming of ballast surfaces where it is necessary to add a large quantity of oil-spreading agent before or at the beginning of deballasting and less at the end of deballasting.

BRIEF DESCRIPTION OF THE DRAWINGS

FIG. 1 is a front view of the apparatus of this invention.

DETAILED DESCRIPTION OF THE PREFERRED EMBODIMENTS

The apparatus of this invention, shown generally by 11 in FIG. 1, is suitable for mounting on the deck or deck mounted tank cleaning machine opening cover above an inerted or pressurized ballast tank having internal threads 13 tapped therein. The apparatus is equipped with a base or deck fitting, shown generally by 14, preferably made of brass having a body portion 15 and a cap portion 16. The body portion contains external threads 17 for threadable engagement with internal threads 13 surrounding the opening. The fitting 14 has a pair of adjacent longitudinal channels formed therein, through one of which channels pressure equalization line 19 extends and through the other of which liquid flow line 20 extends. Incorporated into the body 15 is sight glass 37 through which the flow can be monitored. Also incorporated in the body 15 is air vent 38 for the liquid flow line. An annular seal 18 such as a rubber gasket is nested between the cap and body portion of the fitting to seal the fitting and lines 19 and 20. The lower ends 21 and 22 of lines 19 and 20 extend into the tank to a point above the ballast water contained therein. The pressure equalization line is preferably made of stainless steel having a diameter of about ⅜" and the liquid flow line may also be made of stainless steel having a diameter of about ¼". The upper portion of the pressure equalization line 19 extends through and above container fitting 23, preferably made of brass having internal threads 24. The upper portion of liquid flow line 20 also extends through the fitting into the bottom portion 25 thereof. A gasket 26 inside the bottom portion of the fitting forms a tight seal between container 27 and container fitting 23. Container 27, having external threads 28 on its neck portion is threaded inside the container fitting in the inverted position as shown. When the container is secured in place containing a predetermined amount of spreading agent 29, the upper portion of pressure equalization line 19 extends above the liquid level in the container.

A valve 30 such as a ball valve is located in the intermediate section of the pressure equalization line between the container and deck fitting which is manually operated by means of valve handle 31. Such valve when opened allows equalization of pressure between the ballast tank and the space above the spreading agent in the container. A similar valve 32 having valve handle 33 is located in liquid flow line 20 between the container and deck fitting, the function of which is to admit or stop flow of spreading agent from the container to the tank. Located above valve 32 in line 20 is an adjustable orifice 34 in this case in the form of precision flow control valve with micrometer handle 39 through which gap 35 can be adjusted for precise control of the flow of agent to the tank. A filter 36 may be located in the line 20 above the orifice to remove foreign particulate matter in the spreading agent.

To operate the apparatus, the container, in its upright position, is first filled with a predetermined quantity of liquid spreading agent. The entire apparatus having all valves closed is inverted and the container fitting is then threaded onto the container neck. The apparatus is then reinverted and the deck fitting is threaded into the deck opening. Valve 30 is slowly opened to permit equalization of pressure between the ballast tank and container. The liquid flow line valve 32 is then opened to allow spreading agent to flow by gravity into the ballast tank. The predetermined flow rate of liquid is controlled by the size of the orifice and the initial liquid volume which orifice size can be altered by adjusting the opening of the precision flow control valve by turning the micrometer handle. Typically, for adding spreading agent to ballast, the orifice size should be sufficient to provide flow rates from about 1 mil./min. to 10 mil./min.

Since the apparatus, when connected with an inerted tank, is a closed system, the pressure equalization line prevents the interruption of liquid flow by pressure in the ballast tank as for example at the commencement of liquid addition when the ballast level is high. When addition has begun the flow rate automatically decreases as the liquid head in the container decreases with the vapor pressure in both tank and container being equal at all times. Such a mechanism is highly desirable in the case of the addition of spreading agent to ballast water because it is important at the outset to supply more spreading agent at the beginning of deballasting operations than at the end. In the beginning sufficient spreading agent must be added to compress substantially all floating oil-based material against the steel vertical surfaces of the tank. As ballast is discharged, the spreading agent, in addition to the oil-based material, is also deposited on these surfaces. To prevent oil-based material on these surfaces from reforming itself as a surface film on the receding water surface additional, but less spreading agent is required. It has been found that the apparatus of this invention fulfills these requirements excellently.

What is claimed is:

1. A portable self-contained liquid dispensing device for introducing a liquid additive to the surface of the ballast water in a cargo tank of a tanker vessel before and while the ballast water is being discharged from said cargo tank, said dispensing device comprising:

a container for holding a supply of said additive, a container fitting threadably engaged to the top of said container, a deck fitting including threads for threadable connection to the deck of said tanker vessel, an additive flow line having a first end extending through said container fitting and a second end extending through and substantially beyond said deck fitting, a first shut-off valve located in said flow line adjacent said deck fitting, a flow control valve located in said flow line between said container fitting and said shut-off valve including adjustable orifice means for regulating the flow rate of additive during operation of said dispensing device, a pressure equalization line having a first end extending through said container fitting and terminating substantially adjacent the bottom of said container and a second end extending through said deck fitting, and a second shut-off valve located in said equalization line between said deck fitting and said container fitting, said shut-off valves when in a closed position allowing said dispensing device to be inverted and threadably connected to a threaded aperture in the deck of said tanker vessel with the second end of the additive flow line and the second end of the pressure equalization line extending below the level of said deck without loss of liquid additive, said second shut-off valve when opened being effective to permit equalization of the vapor pressure in the cargo tank and the vapor pressure in the container, whereby when said first shut-off valve is opened liquid additive will flow by gravity from said container onto the surface of the ballast water at a greater initial rate and at a subsequent gradually decreasing rate as the height of the liquid additive in said container decreases for any given adjustment of said orifice means and air vent means mounted in said deck fitting for said flow line.

2. A portable self-contained liquid dispensing device in accordance with claim 1 further including a fluid filter in said flow line between said container fitting and said flow control valve.

3. A portable self-contained liquid dispensing device in accordance with claim 2 further including a sight glass mounted in and integral with said deck fitting adjacent said flow line to permit verification of additive flow in said flow line.

* * * * *

UNITED STATES PATENT OFFICE
CERTIFICATE OF CORRECTION

Patent No. 4,343,326      Dated August 10, 1982

Inventor(s) Ivan P. Pelov and Brian R. Penman

It is certified that error appears in the above-identified patent and that said Letters Patent are hereby corrected as shown below:

Title page, Item [75], Inventor's name, "Iran P. Pelov", should read -- Ivan P. Pelov --.

Signed and Sealed this

Ninth Day of November 1982

[SEAL]

Attest:

GERALD J. MOSSINGHOFF

*Attesting Officer*      *Commissioner of Patents and Trademarks*